3,365,433
PROCESS OF MAKING MOLECULAR SIEVE
CATALYZED VINYL ETHER POLYMERS
John A. Manson, New Providence, and Howard Sorkin, Summit, N.J., assignors to Air Reduction Company, Incorporated, New York, N.Y., a corporation of New York
No Drawing. Filed May 29, 1963, Ser. No. 284,017
3 Claims. (Cl. 260—91.1)

The present invention relates to plastic compositions comprising polymerized vinyl ethers and to a process of preparing them, and it relates more particularly to plastic compositions having especially valuable and unique electrical properties. In its broader aspects, the invention is applicable to related compositions and to their preparation, with controlled quality, by relatively simple and effective methods.

Compositions of the character indicated are of value in the construction of various electronic devices, such as those having electroluminescent and analogous properties. There is frequent need for a plastic, moldable composition, workable at moderate temperatures, which can be used to build the particular elements needed as dielectric components in electronic devices, such as those related to recent developments in solid state physics, e.g. special forms of insulators, high dielectric media for particular purposes, and the like. A particular example of this is the high dielectric matrix needed for luminescent particles called "phosphors," used in making illuminated panels and other devices. These devices take advantage of certain of the special electro-luminescence properties of various phosphor materials, such as the oxide and sulfide type phosphors, particularly activated zinc sulfides and the like. For the purposes of electroluminescence, the polymer is used as a binder to enclose the particulate electroluminescent phosphors (such as zinc sulfide modified with certain activators, e.g. copper, etc. or zinc oxide, and various selenides and the like, particularly activated zinc sulfide). These phosphors produce a bright glow, in the proper environment, when an alternating electric voltage is applied to them. In the production of electroluminescent devices, such as illuminated panels and the like, it is highly important that the finished product be essentially clear and transparent. Otherwise, light will not be emitted with any high degree of efficiency. Materials containing catalyst residues, or containing other impurities, especially water, resulting from attempts to remove the catalyst residues, are not suitable for such purposes. Thus, the binder product obviously should be essentially clear, colorless and transparent. It must possess a high dielectric constant, e.g. of at least 12, and preferably 15 or more. It must have a very low dissipation factor, or tangent $\delta$, preferably below 0.5, and more preferably below 0.05, at the frequencies employed for energization. These frequencies usually range from about 60 cycles to 1000 cycles per second or so, a frequency of 400 cycles often being used. Over this frequency range many of the prior art products which otherwise show promise are not satisfactory in one respect or another. That is to say, they may have good dielectric properties but lack the necessary low dissipation factor, or vice versa. The ceramic type phosphors or electroluminescent devices which have been widely employed in the past have some good properties but their efficiencies and brightness are comparatively very low. They give off only relatively dim light when activated.

The polymer product must also be essentially dry, as indicated above, and it should be essentially free from other contamination. The whole panel must have good brightness at reasonable voltages, e.g. up to 1000 volts at frequencies from 60–1000 c.p.s. and, of course, must last a long time to reduce replacement costs. Lifetime is a function of contamination, as is the color quality.

It has been known for some time that the lower alkyl vinyl ethers and the halogen substituted alkyl vinyl ethers, such as trifluoroethyl vinyl ether can be polymerized to make polymer products of various types. It has not been easy, however, to prepare the types of polymers of relatively high molecular weight and rubbery solid character which are most desirable for purposes such as those set forth above. In U.S. Patent No. 2,820,025 it is pointed out that unsaturated monomeric materials of this type are readily capable of polymerization but it frequently is not a simple task to obtain the most suitable types of polymer. As pointed out in the patent, polymerization of materials such as trifluoroethyl vinyl ether, using peroxide catalysts, was quite unsuccessful. As a matter of fact, the products produced by these catalysts discolored seriously and had very poor properties otherwise.

Polymerization with Friedel-Crafts catalysts, such as boron trifluoride, in the absence of an activating solvent, produced only relatively low-molecular-weight polymers. U.S. Patent No. 2,820,025 points out that rubber-like polymers of higher molecular weight and having other properties desirable for many purposes can be formed, however, by the use of catalysts such as boron trifluoride, provided one uses appropriate and carefully selected solvents. Materials prepared using $BF_3$ catalysts, however, though useful for some purposes, have been found to have an adverse effect upon phosphors, apparently due to contaminants. Thus, trifluoro ethyl vinyl ether was polymerized at $-130°$ C. using $BF_3$ as the catalyst. By precipitating the polymer into water from an acetone solution several times, a product was obtained which was dried for long periods in vacuo at room temperature. Nevertheless, this product contained about 0.5% water, and enough catalyst residues to make the product unsatisfactory for the uses referred to above.

In order to obtain the polymers having the relatively very high dielectric properties, i.e., dielectric constants of the order of 15 or more, and at the same time having low dissipation factors (often stated as low tangent $\delta$), it is necessary to exclude most contaminants, particularly polar contaminants such as water and inorganic catalyst residues. When polymers are made by the methods of the prior art, as exemplified by the above-mentioned patent, the problem of removing the catalyst residues is frequently a very critical one, particularly in materials designed for electrical uses of the type mentioned. Catalyst residues such as $BF_3$ compounds frequently can be neutralized by the use of materials such as ammonia. However, the ammoniated products must also be removed. This involves the use of water or some equivalent solvent. Once introduced into the polymer, water is very difficult to remove.

Hence, an object of the present invention is to provide a polymeric rubbery plastic material having the advantageous electrical properties mentioned above, while at the same time essentially being free from catalyst residues and water contamination, and to provide a process for effectively and efficiently producing such a material.

In accordance with this invention, a process is provided for the polymerization of alkyl vinyl ethers and their derivatives, more particularly their halogenated derivatives. For the purposes mentioned above, the halogenated, and especially the fluorinated lower alkyl vinyl ethers, such as trifluoroethyl vinyl ether, specifically, and its immediate isomers and homologs, and closely related derivatives, appear to be perculiarly suitable. Not only do such polymers have unusually high dielectric constants, which are very desirable for the applications mentioned above, particularly as a high dielectric matrix for phosphors in the production of illuminated panels, but in addition they have unusually low dissipation factors. This factor is commonly indicated as tangent $\delta$. It will be understood, however, that the compositions of the present invention are not limited to such applications and are generally useful for the various purposes for which vinyl ether polymers can be employed.

In general, the invention is particularly concerned with the polymerization of vinyl ethers of the formula R—O—CH=CH$_2$ wherein R is a lower alkyl radical, i.e., an alkyl radical containing up to 6 carbon atoms, which can be unsubstituted or can be partially or fully substituted with halogen atoms, e.g., fluorine atoms.

It has been discovered that vinyl ether polymers of highly advantageous characteristics can be produced by the use of activating or catalytic materials of the type commonly known as "molecular sieves." In particular, properly selected molecular sieves can be used for very effective polymerization of fluorinated ethyl vinyl ethers, and related compounds. However, we have discovered that the molecular sieves employed in accordance with this invention must be carefully selected because certain properties or combination of properties, viz. pore size and acidity, are very critical.

It is a feature of the present invention, however, that specific molecular sieves, including some of the smaller pore-sized molecular sieves, are peculiarly suitable for purposes of this invention. In fact, those larger are not suitable at all. Some of the other molecular sieves are much less satisfactory than certain optimum molecular sieves where they show any polymerization effect at all.

Molecular sieves are well known and typical molecular sieves are described, for example, in the article by R. M. Barrer entitled: "Molecular-Sieve Action of Solids" on pages 293 et seq. of Quarterly Review, vol. III, 1949. When materials such as zeolites are heated, water of hydration is driven off. Removal of water leaves cavities whose size is dependent upon the nature of the metal ion involved.

As is well known, the metal aluminosilicate molecular sieves are essentially dehydrated forms of crystalline siliceous zeolites, containing varying quantities of sodium, calcium and aluminum with or without other metals. All or a portion of the sodium and calcium ions normally contained in the zeolite structure may be replaced with a number of other ions. The atoms of sodium, calcium or metals in replacement thereof, silicon, aluminum and oxygen are arranged in a definite and consistent crystalline pattern. This structure contains a large number of small cavities, inter-connected by a number of even smaller channels. These cavities and channels are precisely uniform in size. Chemically, these zeolites can be represented by the general formula $Me_{x/n}[AlO_2)x(SiO_2)y] \cdot zH_2O$ wherein Me is a metal cation, $x/n$ is the number of exchangeable metal cations of valence $n$, $x$ is the number of aluminum ions combined in the form of aluminate, $y$ is the number of silicon atoms, and $z$ is the number of water molecules, removal of which produces the characteristic channel system. In the above formula, the ratio of $y/x$ is a number from 1 to 5 and usually from 1 to 2. At the present time, there are commercially available several molecular sieves of the "A" series and of the "X" series. A synthetic zeolite known as "Molecular Sieve 4A" is a crystalline sodium aluminosilicate having channels or pores about 4 Angstroms in diameter. In the hydrated form, this material is chemically characterized by the formula $Na_{12}(AlO_2)_{12}(SiO_{12} \cdot 27H_2O$. The synthetic zeolite known as "Molecular Sieve 5A" is a crystalline aluminosilicate salt having channels about 5 Angstroms in diameter and in which substantially all of the 12 ions of sodium in the above formula are replaced by calcium, calcium replacing sodium at the rate of one calcium ion for two sodium ions. Molecular sieves of the "A" series consist fundamentally of a three-dimensional tetrahydral structure of silicon and aluminum. A crystalline sodium aluminosilicate which has pores or channels of approximately 13 Angstrom units in diameter is available commercially under the name of "Molecular Sieve 13X." The letter "X" is used to distinguish the inter-atomic structure of this zeolite from that of the "A" crystals mentioned above. As prepared, the 13X material contains water and has the unit cell formula

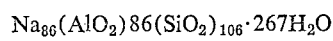

The parent zeolite is dehydrated to make the active catalyst. The synthetic zeolite known as "Molecular Sieve 10X" is a crystalline aluminosilicate salt having channels above 10 Angstrom units in diameter and in which a substantial proportion of the sodium ions of the 13X material have been replaced by calcium.

It has been found that the molecular sieves, whether synthetic or natural, which are most effective are those having pore openings in the neighborhood of about 4 Angstroms and up to a maximum of about 8 Angstroms in diameter, or effective diameter, and a solid acidity (millequivalents/g. $\times 10^2$) of about 3 to about 10. Typical commercial materials having effective combinations of these factors are 4A to 10X sieves. The Linde Type A molecular sieves of 5A size (4.5 acidity; 5 Angstrom pore diameter are particularly satisfactory for the purposes of this invention. Polymerization can be carried out in bulk or in the presence of certain solvents for the monomer. Suitable solvents include normally liquid chlorinated hydrocarbons such as methylene chloride, tetrachloroethylene, chloroform, carbon tetrachloride, and chlorobenzene, and normally liquid aromatic hydrocarbons such as benzene and toluene. Interestingly enough, polymerization will proceed readily in the presence of solvent of the character indicated but solvents such as tetrahydrofuran, probably the best solvent for vinyl ether polymers, and other oxygen-containing solvents such as acetone, methyl isobutyl ketone, and ethyl acetate will quench the reaction. It has been found that the order of addition becomes important when solvents are used, higher molecular weight polymers being formed when the fresh solvent is allowed to remain in contact with the molecular sieves for some time before addition of the monomer than when molecular sieves are added to a previously-formed solution of monomer and solvent.

Polymerization can be carried out at various temperatures from about −80 to as much as 100° C., but the range of 0° to 65° C. is satisfactory for most purposes and a range between room temperature. i.e., about 20° C., and about 65° C. is particularly convenient. Moisture in more than trace amounts is excluded from the polymerization system.

The time of polymerization can vary widely but for batch operation a time of at least 1 hour is generally recommended and times greater than 48 hours are generally not necessary.

It will also be appreciated that the ratio of monomer to molecular sieve can vary but for batch operation at least about 0.4 part of molecular sieves per 100 parts (by weight) of monomer is preferred. Greater quantities can be used but generally not more than 50 parts of molecular sieves per 100 parts of monomer are used. As a general rule 0.4 to 25 parts of molecular sieves per 100 parts of monomer are suitable.

The polymerization can be carried out batchwise, semi-continuously, or continuously. Thus, typical methods for carrying out the reaction include: (A) stirring or shaking the monomer with molecular sieves, (B) refluxing monomer and molecular sieves by specific application of heat, (C) placing the molecular sieves in a soxhlet extractor and refluxing monomer over them, (D) use of a continuous type reactor in which continuously distilled monomer is passed over molecular sieves, freed of polymer by precipitating the latter, and cycling the unreacted monomer back into the still.

The invention will be further understood from the following specific examples of practical application. However, it will be understood that these examples are not to be construed as limiting the scope of the present invention in any manner. In these examples, all parts are by weight, unless otherwise indicated.

Example 1

To 417 parts of 2,2,2-trifluoroethyl vinyl ether distilled over lithium- aluminum hydride in a 1-liter 3-necked flask, equipped with stirrer and condenser with drying tube, were added 26.4 parts of 5A molecular sieves. Refluxing began in 4 minutes. The mixture became viscous after 8–10 minutes. Refluxing ended after 35 minutes but the mixture remained warm for an additional 2.5 hours. After standing overnight, unreacted monomer was removed under reduced pressure. The polymer was dissolved in tetrahydrofuran, and then was pressure filtered. The yield of polymer, determined on an aliquot, was 100% based on recovered monomer and the conversion was 94%.

Example 2

Seventeen parts of 5A sieves were added to 404 parts of 2,2,2-trifluoroethyl vinyl ether at 0° C. in a 1-liter 3-necked flask equipped with stirrer, condenser and drying tube. After 16 hours, a tough polymer remained which was dissolved in tetrahydrofuran and filtered. The clear, colorless polymer solution had a solids content of 0.39 part of polymer per part of solution. The conversion was 75%. The reduced viscosity in tetrahydrofuran (0.5%) was 0.53. The moisture content of the solution was 130 parts per million.

Example 3

Twenty-five parts of 5A sieves were added to 523 parts of 2,2,2-trifluoroethyl vinyl ether which had been distilled over lithium aluminum hydride. A vigorous reaction commenced which quickly brought the monomer to a boil. The polymerization was essentially complete after 20 minutes. Tetrahydrofuran was added to dissolve the polymer after an additional 40 minutes. The solution was filtered under pressure. The moisture content was 270 p.p.m., solids content 31%. The dielectric constant at 100 c.p.s. was 17.2 and the dissipation factor (tan δ) was 0.006.

Example 4

Seventeen and one-half parts of 5A sieves were added to 349 parts of 2,2,2-trifluoroethyl vinyl ether in a 1-liter 3-necked flask equipped in the usual way. The mixture soon refluxed. After standing 24 hours, tetrahydrofuran was added. The moisture content of the solution was 17 p.p.m. before filtration.

Example 5

To 177 parts of 2,2,2-trifluoroethyl vinyl ether were added 3.6 parts of 5A molecular sieves. After 2 hours and 20 minutes the mixture was solid. 371 parts of additional monomer were added and the temperature rose to reflux after 2.5 hours. The polymerization was essentially complete. This represents a conversion of 145 parts of monomer to polymer by one part of catalyst.

In the foregoing examples, general method (A) was employed, viz. stirring or shaking the monomer mixed with the molecular sieves. The refluxing which took place was caused by the heat generated by the reaction and not by specifically applied heat as in general method (B). The accompanying Table I shows the foregoing examples in tabular form and also shows additional examples of the polymerization of trifluoroethyl vinyl ether illustrative of the invention. Included among these examples are some carried out in accordance with method (B) viz. refluxing monomer and molecular sieves, and some carried out in accordance with method (C) described above.

In Table I it will be noted that, generally speaking, conversion was highest with the 5A molecular sieves. Conversion of the order of 95% and yields close to 100% could be obtained merely by stirring the molecular sieves with the monomer. When the reaction was carried out in uncooled flasks, the polymer quickly began to reflux and the polymerization was complete in less than one hour.

The 10X molecular sieves gave a 76% conversion over a 24 hour period, when the same ratio of monomer to molecular sieves was employed as in the case of the 5A molecular sieves. Attempts to polymerize the same monomer under the same conditions with 13X molecular sieves gave no polymer at all.

In general the highest proportions of monomer to molecular sieves for polymerization were achieved with the 5A and the 10X sieves.

Monomer to molecular sieves ratios of as low as 50 to 1 were satisfactory, particularly with the use of the 5A sieve. Enough monomer was added in one case (Example 5) to bring the ratio to 154 to 1. Even so, polymerization started up again on further addition of monomer, indicating that very low proportions of molecular sieves may be used effectively and that the effectiveness of the catalyst is not destroyed.

TABLE I

| Ex. No. | Method | Time (hrs.) | Temp. (° C.) | Molecular Sieves Type | Molecular Sieves Wt. | Monomer Wt. | Conversion (percent) | $\eta_{sp}/c$ |
|---|---|---|---|---|---|---|---|---|
| 1 | A | 2.5 | 25–42 | 5A | 26 | 417 | 94 | |
| 2 | A | 16 | 0.14 | 5A | 17 | 404 | 75 | 0.53 |
| 3 | A | 1 | 25–42 | 5A | 25 | 523 | 95 | |
| 4 | A | 24 | 25–42 | 5A | 17.5 | 349 | 95 | |
| 5 | A | 72 | 25.42 | 5A | 3.6 | 548 | 95 | |
| 6 | C | 24 | 42 | 4A | 33.6 | 147 | 5.2 | |
| 7 | B | 23 | 42 | 4A | 25 | 89 | 14.3 | 0.62 |
| 8 | B | 24 | 42 | 4A | 50 | 111 | 21.0 | |
| 9 | C | 24 | 42 | 4A | 33 | 183 | 7 | 0.43 |
| 10 | C | 24 | 42 | 5A | 31 | 155 | 64 | 0.12 |
| 11 | C | 24 | 42 | 5A | 10 | 200 | 50 | 0.14 |
| 12 | C | 24 | 42 | 5A | 30 | 150 | 80 | 0.11 |
| 13 | C | 24 | 42 | 10X | 30 | 156 | 72 | 0.09 |
| 14 | A | 20 | 25.31 | 10X | 24 | 498 | 76 | |
| 15 | A | 3 | 25.42 | 5A | 23 | 513 | 94 | |
| 16 | A | 20 | 25.42 | 5A | 24 | 537 | 94 | 0.25 |
| 17 | A | 24 | 25.42 | 5A | 31 | 493 | 95 | |
| 18 | A | 16 | −10–25 | 5A | 23 | 552 | 42 | 0.65 |
| 19 | A | 21 | 15 | 5A | 12 | 339 | 67 | 0.41 |

TABLE II

| Ex. No. | Solvent | Time (hrs.) | Solvent Wt. | Molecular Sieves Wt. | Monomer Wt. | Conversion, percent | $\eta_{sp}/c$. |
|---|---|---|---|---|---|---|---|
| 20 | Methylene chloride | 21 | 8.5 | 6.7 | 114 | 84 | 0.27 |
| 21 | ...do... | 21 | 17.0 | 5.95 | 101 | 57.8 | 0.17 |
| 22 | ...do... | 21 | 25.5 | 5.18 | 88 | 64.7 | 0.19 |
| 23 | ...do... | 21 | 34.0 | 4.4 | 75.5 | 60.0 | 0.17 |
| 24 | ...do... | 48 | 34.0 | 4.4 | 75.5 | 89.5 | 0.25 |
| 25 | ...do... | 21 | 51.0 | 2.97 | 50.5 | 62.5 | 0.19 |
| 26 | ...do... | 21 | 78.0 | 1.48 | 25.2 | 44.2 | 0.17 |
| 27 | ...do... | 21 | 34.0 | 4.4 | 75.5 | 77.5 | *0.54 |
| 28 | Tetrachloro ethylene | 20 | 96.5 | 4.4 | 34 | 25.8 | 0.10 |
| 29 | Benzene | 20 | 46.8 | 4.4 | 34 | 75.5 | 0.15 |
| 30 | ...do... | 20 | 62.4 | 3.3 | 25.2 | 45.3 | 0.15 |
| 31 | Carbon tetrachloride | 20 | 92.4 | 4.4 | 34 | 45.3 | 0.16 |
| 32 | ...do... | 20 | 123.2 | 3.3 | 25.2 | 26.2 | 0.15 |
| 33 | Toluene | 20 | 55 | 4.4 | 34 | 76.2 | 0.06 |
| 34 | Chlorobenzene | 20 | 67.5 | 4.4 | 34 | 62.4 | 0.17 |
| 35 | Chloroform | 20 | 71.7 | 4.4 | 34 | 7.3 | 0.13 |

*In this example, the solvent and the molecular sieves were allowed to remain in contact for one week before addition of the monomer.

In Table II there are tabulated Examples 20–35 of the polymerization of trifluoroethyl vinyl ether which show the process of the invention carried out in the presence of various organic solvents. In all of these examples, 5A molecular sieves were used and polymerization was carried out at 25° C. Polymerization was stopped at the end of the time periods indicated by adding 40 parts of tetrahydrofuran to the polymerization solution.

The products produced in the preceding examples exhibited desirable electrical characteristics.

*Example 36*

Five parts of type 5A molecular sieves were added to 75 parts of methyl vinyl ether at 0° C. The temperature was allowed to rise to reflux (6° C). After 4 hours, excess monomer was allowed to evaporate. Poly (methyl vinyl ether) was formed in 22% conversion. This polymer was soluble in benzene, methanol, and cold water.

*Example 37*

To 38.1 parts of trifluoroisopropyl vinyl ether were added 3.3 parts of type 5A molecular sieves. The temperature rose to 40° C. in 3 minutes. An additional 32.7 parts of monomer were added. The temperature rose to reflux within 20 minutes, and the mass set as a solid in 40 minutes. After cooling to room temperature, excess monomer (about 1 part) was removed under reduced pressure. The polymer was dissolved in methylene chloride and pressure filtered. A clear, colorless, non-tacky film could be cast from this solution.

*Example 38*

To 44.1 grams of pentafluoropropyl vinyl ether were added 3.4 grams of type 5A molecular sieves. After stirring for 2.5 hours an increase in viscosity was noted. The temperature then quickly rose to reflux and the mass polymerized in minutes. The conversion was complete. The polymer was insoluble in methylene chloride but soluble in acetone. Following pressure filtration, a clear, colorless, slightly tacky film was cast on mercury.

*Example 39*

To 55 parts of heptafluorobutyl vinyl ether were added 5 parts of type 5A molecular sieves. Polymerization occurred slowly during the first 105 minutes. Rapid polymerization then took place and was complete in about 10 minutes. The polymer was found to be insoluble in the common organic solvents.

A comparison of the electrical behavior of a representative polymer produced in accordance with this invention and of a representative polymer produced by boron fluoride catalysis, both with and without washing, are given in Table III. In this table E' represents the dielectric constant and E'' represents the dissipation factor, tangent δ.

TABLE III

| Catalyst | Frequency c.p.s. | E' | E'' |
|---|---|---|---|
| $BF_3.OEt_2$ | 100 | 17.3 | 0.100 |
| $BF_3.OEt_2$ (polymer washed) | 100 | 15.1 | 0.032 |
| 5A molecular sieves | 100 | 17.2 | 0.006 |

One outstanding feature of the process of this invention is the fact that the water content of the polymer product can be effectively controlled. It has been noted that polymers produced by the use of $BF_3$ catalyst contained as much as 0.5% water (5000 p.p.m.), whereas water contents of around 170 p.p.m. and less are readily obtained by use of molecular sieves. Generally, the water content should be not more than 0.01 to 0.025% (100 to 250 p.p.m.) and even lower percentages are desirable, e.g., less than 100 and even down to 10–20 p.p.m. This is essentially true of other contaminants. Another feature of the process of the invention is that completely reproducible polymers can be readily prepared. The polymers that can be produced have outstanding heat and light stability and are clear and water white. Prolonged exposure to air does not produce any yellowing of the type encountered when polymers of the same monomers are prepared by other methods e.g., boron trifluoride catalysts. A typical polymer of this invention was heated at 95° C. in air for 30 hours with no detectable change in its appearance or in its infra red spectrum. Fifty-two hours under a strong ultra violet light similarly produced no decomposition. A further important feature of polymers produced by the process of this invention, particularly trifluoroethyl vinyl ether polymers, is their good natural adhesion to surfaces, such as glass surfaces. It has not been found necessary to use adhesion-promoting additives with them.

The polymers of the present invention, in their preferred form, are rubbery at normal temperatures and have desirable physical and electrical properties, such as intrinsic viscosity, flexibility, high dielectric constant (over lower frequencies) and the like. They generally have softening points between about 60° and 80° C., although they may go as high as 100° C.

The molecular weights of the rubbery polymers produced by the process of the invention range between about 10,000 and 100,000. Their reduced viscosities ($\eta_{sp}/c$.) measured in conventional manner with 0.5 g. per 100 cc. of total solution in tetrahydrofuran at 25° C., generally vary between about 0.1 and 2.0. The molecular weight can be readily controlled and is proportional to the reciprocal of the absolute temperature at which the polymerization is conducted. Polymers having a reduced viscosity of 0.4 to 1.0 are particularly useful.

It will be understood that other monomers compatible with the vinyl ethers used in accordance with this invention may be polymerized in admixture with the vinyl ether monomer such as lower vinyl esters, vinyl halides, and even olefinic materials, so long as they do not adversely affect the polymer properties. Similarly the polymers of this invention can be blended with other polymers such as olefin polymers, in varying proportions, e.g. 1:2 to 2:1.

To prepare electroluminescent and analogous compositions from the polymers of this invention, conventional phosphors or the like are compounded with the polymers in conventional manner, and the resulting compositions are formed into panel elements or like forms by conventional techniques in the art. Any of the known phosphors such as oxide and sulfide type phosphors, e.g., activated zinc sulfides, are suitably used.

It will be understood that the invention is not limited to the polymerization of the monomers specifically referred to above, including trifluoro vinyl ethyl ether. In its broader aspects, as will readily occur to those skilled in the art, the invention is applicable to other vinyl ethers and their obvious derivatives. The claims which follow are intended to cover these and other modifications and equivalents as far as the state of the prior art properly permits. It is intended, therefore, that all matter contained in the foregoing description is intended to be interpreted as illustrative only and not as limitative of the invention.

We claim:
1. A rubbery polymer composed primarily of trifluoroethyl vinyl ether having a reduced viscosity at 25° C. in tetrahydrofuran between about 0.4 and 1.0 containing less than 250 p.p.m. of water, having a softening point between about 60° and 80° C., and having at the same time a high dielectric constant and a low dissipation factor under applied alternating voltage of frequency less than 1000 cycles per second, said polymer being produced by contacting said ether at a temperature of about −80° to 100° C. with metal aluminosilicate molecular sieves having effective pore openings of diameters of 4 to 8 Angstroms and a solid acidity of about 3 to about 10, in the substantial absence of moisture.

2. As a composition of matter, a solid rubbery polymer of 2,2,2 - trifluoroethyl vinyl ether having a moisture content below about 250 p.p.m., a dielectric constant at 400 cycles per second of not less than 12, a dissipation factor below 0.5, a softening point between about 60 and 100° C., and a reduced viscosity at 25° C. in tetrahydrofuran between 0.1 and 2.0, said polymer being produced by contacting said ether at a temperature of about −80° to 100° C. with metal aluminosilicate molecular sieves having effective pore openings of diameters of 4 to 8 Angstroms and a solid acidity of about 3 to about 10, in the substantial absence of moisture.

3. A polymer of dielectric constant above 12, a low dissipation factor, tangent δ, below about 0.5, and a reduced viscosity between about 0.1 and 2.0, produced by polymerizing dry 2,2,2 - trifluoroethyl vinyl ether by contacting said ether with metal aluminosilicate sieves at a temperature between −80 to 100° C. for a period of time sufficient to produce a solid rubbery polymer, said molecular sieves having effective pore diameters of 4 to 8 Angstroms and a solid acidity of 3 to 10.

References Cited
UNITED STATES PATENTS

| | | | |
|---|---|---|---|
| 2,732,370 | 1/1956 | Codding | 260—91.1 |
| 2,820,025 | 1/1958 | Schilkdknecht | 260—91.1 |
| 3,208,984 | 9/1965 | Dekking | 260—91.1 |
| 3,228,923 | 1/1966 | Scott et al. | 260—91.1 |
| 2,799,669 | 7/1957 | Zoss | 260—91.1 |
| 3,047,555 | 7/1962 | Arquette | 260—91.1 |
| 3,011,978 | 12/1961 | Goshell et al. | 252—301.3 |
| 3,125,536 | 3/1964 | O'Brien | 252—301.3 |

JOSEPH L. SCHOFER, *Primary Examiner.*

HARRY WONG, JR., *Assistant Examiner.*

UNITED STATES PATENT OFFICE
CERTIFICATE OF CORRECTION

Patent No. 3,365,433                                    January 23, 1968

John A. Manson et al.

It is hereby certified that error appears in the above numbered patent requiring correction and that the said Letters Patent should read as corrected below.

Column 3, line 62, the formula should appear as shown below instead of as in the patent:

$$Me_{x/n} [(AlO_2)x(SiO_2)y] \cdot zH_2O$$

column 4, line 1, the formula should appear as shown below instead of as in the patent:

$$Na_{12}(AlO_2)_{12}(SiO_2)_{12} \cdot 27H_2O$$

line 35, for "diameter" read -- diameter) --; column 5, line 38, for "part", first occurrence, read -- parts --; columns 5 and 6, TABLE 1, fourth column, lines 2, 5, 14, 15, 16 and 17, for

| | | |
|---|---|---|
| 0.14 | | 0-14 |
| 25.42 | | 25-42 |
| 25.31 | | 25-31 |
| 25.42 | read | 25-42 |
| 25.42 | | 25-42 |
| 25.42 | | 25-42 |

Signed and sealed this 24th day of June 1969.

(SEAL)
Attest:

EDWARD M. FLETCHER, JR.                      WILLIAM E. SCHUYLER, JR.
Attesting Officer                                      Commissioner of Patents